(12) United States Patent
van Brandenburg et al.

(10) Patent No.: US 9,607,132 B2
(45) Date of Patent: Mar. 28, 2017

(54) TOKEN-BASED VALIDATION METHOD FOR SEGMENTED CONTENT DELIVERY

(71) Applicants: Koninklijke KPN N.V., The Hague (NL); Nederlandse Organisatie voor Toegepast-Natuurwetenschappelijk Onderzoek TNO, Delft (NL)

(72) Inventors: Ray van Brandenburg, The Hague (NL); Mattijs Oskar van Deventer, Leidschendam (NL); Martin Prins, The Hague (NL)

(73) Assignees: Koninklijke KPN N.V., The Hague (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 14/056,127

(22) Filed: Oct. 17, 2013

(65) Prior Publication Data

US 2014/0115724 A1    Apr. 24, 2014

(30) Foreign Application Priority Data

Oct. 22, 2012  (EP) .................................... 12189386

(51) Int. Cl.
  *G06F 21/10*  (2013.01)
  *H04L 29/06*  (2006.01)
  *H04L 29/08*  (2006.01)

(52) U.S. Cl.
  CPC .......... *G06F 21/10* (2013.01); *H04L 63/0807* (2013.01); *H04L 63/0846* (2013.01); *H04L 65/4084* (2013.01); *H04L 67/02* (2013.01)

(58) Field of Classification Search
  CPC ..... H04L 63/00; H04L 63/08; H04L 63/0807; H04L 63/0846; H04L 65/00; H04L 65/40;
  (Continued)

(56) References Cited

U.S. PATENT DOCUMENTS

| 8,533,796 | B1 * | 9/2013 | Shenoy et al. ................. 726/6 |
| 2004/0162787 | A1 | 8/2004 | Madison et al. |

(Continued)

FOREIGN PATENT DOCUMENTS

| WO | WO2008089338 | 7/2008 |
| WO | WO2011119554 | 9/2011 |

OTHER PUBLICATIONS

"Information Technology—Dynamic Adaptive Streaming Over HTTP (DASH)—Part 1: Media Presentation Description and Segment Formats", International Standard, ISO/IEC, 23009-1, Apr. 1, 2012, 134 pages.

(Continued)

*Primary Examiner* — Jung Kim
*Assistant Examiner* — Adrian Stoica
(74) *Attorney, Agent, or Firm* — McDonnell Boehnen Hulbert & Berghoff LLP

(57) ABSTRACT

A token-based validation method for delivery of at least part of a segmented content item and a content delivery system configured for executing such method are described. Said segmented content item may be associated with at least one manifest file comprising one or more segment identifiers. The method may comprises the steps of: a content processing device sending a first segment request message comprising a first segment identifier associated with a first segment to said at least one delivery node; generating first validation information for use with a further second segment request message, said first validation information comprising at least a first token and associated first timing information; and, sending a first response message and said first validation information to said content processing device, said first response message comprising at least part of said segment or location information associated with at least one delivery node for delivering said segment.

28 Claims, 7 Drawing Sheets

(58) Field of Classification Search
CPC . H04L 65/4069; H04L 65/4084; H04L 67/00; H04L 67/02; G06F 21/00; G06F 21/10; G06F 21/60

See application file for complete search history.

(56) References Cited

U.S. PATENT DOCUMENTS

| | | | | |
|---|---|---|---|---|
| 2007/0038873 | A1* | 2/2007 | Oliveira et al. | 713/193 |
| 2012/0089841 | A1 | 4/2012 | Boyer et al. | |
| 2012/0275597 | A1* | 11/2012 | Knox et al. | 380/210 |
| 2013/0125223 | A1* | 5/2013 | Sorotokin et al. | 726/6 |
| 2013/0283033 | A1* | 10/2013 | Ahuja et al. | 713/150 |

OTHER PUBLICATIONS

"3rd Generation Partnership Project: Technical Specification Group Services and System Aspects; Transparent End-to-End Packet-Switched Streaming Service (PSS); Progressive Download and Dynamic Adaptive Streaming Over HTTP (3GP-DASH) (Release 12)", 3GPP TS 26.247 V12.0.0 (Sep. 2013), pp. 1-114.

"Smooth Streaming: The Official Microsoft IIS Site", www.iis.net/downloads/microsoft/smooth-streaming, pp. 1-3 (printed from the World Wide Web on Oct. 16, 2013).

"HTTP Dynamic Streaming/Features", www.adobe.com/products/hds-dynamic-streaming/features.html, pp. 1-2 (printed from the World Wide Web on Oct. 16, 2013).

European Search Report, European Patent Application No. 12189386.1, dated May 14, 2013.

Sniffen, Brian, "Practically Engageable Adversaries for Streaming Media", Fast2009, Jan. 1, 2009, http://diadem.wiki.evenmere.org/users/bts/publications/sniffen-fast2009-web.pdf, pp. 1-9.

van Brandenburg, R. et al., "Models for Adaptive-Streaming-Aware CDN Interconnection, draft-brandenburg-cdni-has-02", CDNI Internet-Draft, Jun. 27, 2012, pp. 1-42.

Pantos, R., "HTTP Live Streaming", draft-pantos-http-live-streaming-07, Informational Internet-Draft, Sep. 30, 2011, pp. 1-33.

"Downsides of HTTP adaptive bit rate streaming" Jet-Stream Online document, Feb. 24, 2012, downloaded from at http://www.jet-stream.nl/blog/2012/02/24/downsides-of-http-adaptive-bitrate-streaming/.

"Web Playlists" Microsoft Online document, Jun. 10, 2010, downloaded from https://technet.microsoft.com/en-us/library/ee791789(v=ws.10).aspx.

"Smooth Streaming and Web Playlists" Microsoft Online forums, Mar. 30, 2009, downloaded from http://forums.iis.net/t/1156428.aspx.

"Re: [CDNi] Status of Adaptive Streaming and CDNI draft" IETF Online Email Thread, May 27, 2012, downloaded from http://www.ietf.org/mail-archive/web/cdni/current/msg01019.html.

"ABR Session-Based Encryption and Session Tracking" Cisco Online Configuration Guide Appendix G, 2012, downloaded from http://www.cisco.com/c/en/us/td/docs/video/cds/cda/is/3_0/configuration_guide/is_cds30-cfguide/ABRsessionEncryption.html.

"Product Overview" Cisco Online Configuration Guide Appendix G, 2012, downloaded from http://www.cisco.com/c/en/us/td/docs/video/cds/ccla/is/3_0/configuration_guide/is_cds30-cfguide/prodview.html.

\* cited by examiner

TOKEN-BASED VALIDATION METHOD FOR SEGMENTED CONTENT DELIVERY

"CROSS REFERENCE TO RELATED APPLICATIONS

The present patent application claims priority under 35 U.S.C. §119(b) to EP 12189386.1, which was filed Oct. 22, 2012. The full disclosure of EP 12189386.1 is incorporated herein by reference."

FIELD OF THE INVENTION

The invention relates to a method for enabling token-based validation of segmented content delivery, and, in particular, though not exclusively, to a method and a content delivery system for enabling token-based validation in the delivery of at least part of a segmented content item, a validation module, a client and a database structure for use in such system and a computer program product for using such method.

BACKGROUND OF THE INVENTION

Content providers generate and sell content but rarely deliver it directly to a buying consumer. Instead, the delivery of the content to a consumer is outsourced to an intermediate party, a content distributor, which is configured to control a content distribution platform comprising one or more content delivery networks (CDNs) for efficiently delivering content to large numbers of users. CDNs are especially suited for delivery of so-called segmented or tiled video content. For example, HTTP adaptive streaming (HAS), Scalable Video Coding (SVC) and spatially segmented video (e.g. tiled video) use segmentation of content on the basis of time, quality and space respectively.

During the segmentation process a so-called manifest file will be generated which describes the relation between the different segment files and/or streams and may also describe the location from where the segments may be retrieved. A manifest file (also known as a Media Presentation Description or MPD for MPEG-DASH or M3U8 playlist for Apple HTTP Live Streaming) may relate to a file comprising segment identifiers identifying segments and their associated location information, e.g. URLs. Segments identified in the manifest file may be retrieved by a file retrieval protocol, e.g. HTTP or FTP. Alternatively, segments identified in the manifest file may be retrieved using a streaming protocol, e.g. RTSP/RTP or HAS. A segment file or segment stream hereafter will be referred to as a segment. Further, a video title, or more in general, a content item deliverable or retrievable through a segmentation scheme (e.g. as described in a manifest file) may be referred to as a segmented content item. In order to enable a client to access a stored segmented content item in a CDN, the client is provided with the manifest file so that it is able to retrieve the segments.

An important responsibility of a content distributor is to make sure that it only delivers content (e.g. a segmented content item) to those users who have obtained the rights to access it. Therefore, when the content distributor receives a request for content from a user, it first validates the request. The process of validating a request for content may include authenticating the request (checking the identity of the requestor) and/or authorizing the request (checking whether the requestor is authorized to access the requested content).

The process of validating requests for content is not only important for the content provider but also for the content distributor, who can only charge the content provider for users who have legitimately accessed the content. One of the risks that a content distributor may face is deep-linking wherein a legitimate user obtains the right to access a single particular content item (e.g. by paying for it), receives information on the location of one or more delivery nodes comprising the content item (e.g. a manifest files comprising URLs of segments) on the basis of an authentication process wherein the user is first authenticated before it receives the manifest file, and wherein such user then (illegally) distributes the content of the manifest file, e.g. the location information, to other non-authorized users (e.g. by placing the full URLs on a website). In that case, when another (unauthorized) user opens (uses) such an URL, such user can then directly request (an retrieve) the content without having paid for it.

In non-HAS scenarios a token-based validation method is known to be used in order to prevent or mitigate threats like deep-linking. Such known token-based validation method uses the concept of a content provider (CP) generating a unique token for each user request for access to a particular content item and then passing such token to the CDN in a redirection process. Whereas such token-based validation has proven to be an effective validation method for validating the purchase of certain content items, deliverable through CDNs to consumers, there are disadvantages when applying it to systems or methods, used for delivering content (items) on the basis of one of the various protocols for the delivery of segmented content, e.g. using an adaptive streaming protocol such as an HTTP-based adaptive streaming (HAS) protocol.

Applying such validation method in an admission control solution for accessing a segmented content item, could be done by using such token-based validation for the initial manifest request (hence for retrieving the manifest file). In this scenario, the initial request for (retrieving/accessing) the segmented content item is sent to the content provider (as in the non-HAS scenario). Upon receiving this request, the content provider redirects the user to the CDN, whereby the content provider inserts a newly generated token in the redirection request. When the CDN receives this token from the user (e.g. the client), it validates it and, after the token is confirmed to be valid (and hence that the request originates from an user that has permission to access the requested content), it sends a manifest file to the client. However, HAS is session-less and—from a HAS supporting CDN perspective—there exists no correlation between one request for (part of a) content (item) and any other (subsequent) request. Therefore the disadvantage of the above solution is that it introduces a new (more advanced) deep-linking vulnerability. Specifically, it introduces the possibility for a malicious user to create a new manifest file in which it points to the "open" non-protected segment URLs on the CDN. This way segments may be directly accessed, thereby circumventing the content provider and the manifest-level token-based validation mechanism.

One solution to the problem of deep-linking manifest files may be the use of an URL obfuscating technique as e.g. used in Microsoft Web Playlists. URL obfuscation replaces the full URL (excluding the FQDN part) in a playlist with a one-time string, which is only valid the first time it is being requested and can only be requested by the same client to which the manifest file was sent. Applying such solution to HAS would however by necessity turn HAS into a state-full protocol, wherein the network has to maintain information about the clients that have been provided with manifest files with obfuscated URLs. Such solution would thus eliminate one of the primary advantages of HAS, i.e. that it is a low-overhead stateless protocol. Another drawback is that it introduces problems for the frequently occurring situation wherein different CDN nodes deliver different segments to the user, since in that case the CDNs need to exchange session information.

Another solution to the problem of deep-linking manifest files is presented in section 3.5.3 of the document draft-brandenburg-cdni-has [http://tools.ietf.org/html/draft-brandenburg-cdni-has-02]. In this solution, the manifest file itself is rewritten by the CDN so that each segment URL in the manifest contains an individual token. In that case however the tokens need to be valid for a long period of time, since a long time period may pass between the creation and delivery of the manifest file and the client requesting the last segments in the manifest file. In practice this would mean that the tokens would have to be valid for at least the duration of the content play-out time, which could be easily be several hours or more. This significantly decreases the level of security provided by the token-based validation, since a malicious user would have plenty of time for distributing the acquired manifest file to other potential users.

Hence, methods and systems are desired which mitigate the risk of abuse of existing token-based validation methods used in the delivery of a segmented content item to a content processing device.

SUMMARY OF THE INVENTION

It is an objective of the invention to reduce or eliminate at least one of the drawbacks known in the prior art. In one aspect the invention may relate to a method for enabling token-based validation of the delivery of at least part of a segmented content item by one or more delivery nodes to at least one content processing device, wherein a segmented content item may be associated with one or more segment identifiers. In an embodiment, the segmented content item may be associated with at least one manifest file comprising one or more segment identifiers, e.g. a file name, and, optionally, location information, e.g. an URL, associated with said one or more delivery nodes. The method may comprise: said content processing device, preferably a user terminal comprising a HTTP Adaptive Streaming (HAS) client, sending, preferably on the basis of a manifest file, a first segment request message comprising a first segment identifier associated with a first segment to said one or more delivery nodes; preferably a validation module associated with said one or more delivery nodes, generating first validation information for validating a second segment request message, said first validation information comprising at least a first token and first timing information, wherein said first timing information is associated with the processing of said first segment request by said one or more delivery nodes; and, sending said first validation information to said content processing device.

The method according to the invention provides a token-based validation scheme for the delivery of segmented content to a content processing device. Upon receiving a segment request, e.g. a request for delivering a predetermined segment or a manifest file, from a content processing device, validation information is generated and sent to said content processing device along with the requested segment or the manifest file (or along with information where the requested segment can be retrieved (e.g. in a HTTP redirect message)). The validation information may be put in a further segment request and subsequently used to validate (authenticate and/or authorize) a further segment request originating from the content processing device.

Because during streaming of segmented content, segments are requested on a frequent basis, e.g. every 5-30 seconds depending on the segment length, by the content processing device, the validation information for each request only needs to be valid for a relatively short time. This way the validation scheme is less sensitive to replay attacks and more robust against the threat of deep-linking.

Moreover, the validation scheme is based on a stateless protocol so that it is particularly suitable in a situations where different segments are being delivered to different clients by different delivery nodes. No state or session information is necessary on the server-side to execute the validation process. The method does not need generation and maintenance of state information or session information between network nodes and/or clients thereby reducing the complexity of the system and increasing its robustness.

In yet another embodiment, said timing information may comprise a first clock-time associated with the processing of said first segment request message by said content delivery node. Hence, timing information may comprise (part of) a wall clock time associated with (for example derived from a processing time) the processing of a request for content originating from a content processing device, wherein the processing of a request may for example include: the reception of a request or parsing of the request by the delivery node, the validation of the request or the (start of the) generation of a token for the (subsequent) second request. This wall clock time may be used in the validation process for a subsequent request for a segment.

In an embodiment, at least part of said first validation information may be sent in a first response message to said content processing device. In a preferred embodiment said first response message comprises a manifest file and said at least part of said first validation information is comprised in said manifest file. In further embodiments at least part of said first validation information is comprised in a URL query or URL query string of said first response message. Whenever the segment request message is for retrieving a manifest file, there are large advantages in providing at least part of the validation information (e.g. a token) in the manifest file, instead of in for instance a cookie (set-cookie field of a HTTP header). By providing the first validation information in a query string of a response message or in an especially arranged manifest file (as part of a response message), the possible disadvantages of cookie-based mechanisms are circumvented.

A cookie based mechanism has the limitation that cookies can only be set (e.g. returned in the first response message) for the domain (and its subdomains) that the segment request message is directed to in the first place.

Thus validation information (tokens) based on cookie values of cookies provided by for instance a content provider are not put in further segment request messages that are directed at other domains than the initial domain. E.g. when the content provider is Disney (Disney.com) and the content distributor is KPN (KPN.com). Additional problems may occur when parts of the content delivery is distributed across multiple domains (different CDN's). For instance when the manifest file is delivered from an upstream CDN and content segments are to be retrieved from one or more downstream CDN's. Or for example when popular parts of a segmented content (stream) are more widely distributed closer to the end-user devices (e.g. the content processing devices) in a downstream CDN and less popular parts are stored in the upstream CDN. Another example is when one content representation (for instance a high definition (high bandwidth) stream) is stored in one domain and another content representation (for instance a low definition (low bandwidth)) stream in another domain. The large advantage of HTTP-based adaptive streaming, which is the seamless switching between representations of a content depending on network conditions, may not be possible with cookie-based solutions, since a cookie can only be set through a HTTP response message for the domain to which the preceding (segment) request message was directed. In the example, when switching streams (representations), a segment of another stream, delivered by another domain, is requested. However such request would no longer contain the necessary validation information and thus the chain would be broken. Hence cookie-based solutions, would only be feasible in the field of segmented streaming, when a (segmented) content associated with a manifest file would be confined to one domain (and its subdomains). Even then cookie-based solution may have additional disadvantages, such as that certain browsers (and/or streaming clients) may not accept cookies, and/or certain virus scanners may intercept cookies.

Additionally, it may be difficult to selectively implement a cookie-based solution for different content representations belonging to the same domain (e.g. one would want to implement the authentication chaining for high-end streams, but there would be no need for low-end streams). A cookie set when retrieving a manifest file containing identifiers for retrieving both the high-end and low-end representations (streams), could not discriminate between these.

In another embodiment, said response message, preferably a HTTP OK or HTTP Redirect message, may comprise at least part of said segment or location information associated with at least one delivery node for delivering said segment. In yet another embodiment, at least part of said location information or said first validation information (e.g. said token) may be embedded in an URL of said response message or in the header, preferably in a header field of a HTTP header, of said response message.

In embodiments of the invention, such header field is communicated to the content processing device via a manifest file. Hence a manifest file may provide the content processing device with information on how to interpret a HTTP response message, in order for the content processing device to be able to extract the validation information from a HTTP response message such that it may use this information in a subsequent segment request. Such HTTP header field is preferably not a standardized http cookie field such as the "Set-Cookie" header field. The use of cookies (cookie-based mechanism) for transport of validation information has numerous disadvantages as described in this application. By using a different (HTTP) header field than the one used for cookies for providing validation information to the content processing device, these disadvantages may be overcome. Since a cookie-based mechanism is based on default standardized behaviour, using another mechanism would require the content processing device to be instructed (adapted) to interpret such header field and to use the validation information of such field in a future request. For instance in a manifest file it may be indicated how and for which future segment request the validation information is to be used, as detailed in further embodiments of the invention.

In an embodiment, the method may further comprise: said content processing device sending a second segment request message, comprising a second segment identifier, and said first validation information to said at least one delivery node; validating said second segment request on the basis of said first validation information; and, optionally, generating second validation information for validating a third segment request message, said second validation information comprising at least a second token and second timing information, preferably a second clock-time, associated with the processing of said second segment request by said content processing device. Hence, every time when the network node receives a request for segmented content, validation information (comprising a token and timing information) is determined (by a validation module associated with (e.g. comprised in or connected to the network node) the network node) and sent to the content processing device so that the validation information can be used for validating the next request message which is going to be sent to the delivery node.

In further embodiments of the invention, said first validation information is comprised in a URL query (query string) of said first or second segment request message. This allows for a mechanism that is not based on cookies, and hence that does not have the disadvantages of cookie-based mechanism as earlier described in this application.

In yet further embodiments at least part of said second validation information is comprised in an URL, preferably as part of an URL query or URL query string of a second response message.

In an embodiment, validating said second segment request may comprise: authenticating said first segment request message on the basis of said token and, optionally, said first timing information; and/or, authorizing said first segment request message on the basis of: said first timing information, preferably a first clock-time associated with the processing of said first segment request message; and, a token validity time associated with a time period in which the token is valid. The validation process thus may include the process of authentication and/or authorization.

In an embodiment said first token may be generated on the basis of a token algorithm, preferably a one-way function, and, optionally, said first timing information. In a further embodiment, validating said second segment request may comprise: generating a reference token on the basis of said token-generating algorithm and, optionally, said first timing information; comparing said reference token with said first token. The use of a one-way function, e.g. a hash function, allows a simple and fast way of authenticating a request.

In a further embodiment said first token may be generated on the basis of at least part of said segment identifier or a content collection identifier (CCI) and/or an identity, preferably an IP address, of the content processing device. Further information may be used to determine a token so that the token can be tied to a particular device or a particular set of segments. A CCI may comprise an identifier, e.g. a number, preferably a unique number, which links all segments (chunks) belonging to the same manifest file (representing a segmented content item or a content collection, i.e. a collection of segments forming a video title) together.

In another embodiment said first token may be generated on the basis of a token algorithm and a content collection identifier (CCI) associated with said requested segment. In yet another embodiment, validating said second segment request may comprise: associating said first segment identifier with a content collection identifier; generating a reference token on the basis of said token algorithm and said content collection identifier; and, comparing said reference token with said first token. When using the CCI during the token authentication, the token cannot be used for requesting other, not related segments. This way misuse of tokens can be prevented.

In another embodiment, the token algorithm may comprise a symmetric or asymmetric encryption function. In this embodiment, the validation information, in particular the timing information, may be encrypted wherein the result of the encryption operation may be used as a token. An advantage of such an embodiment is that in this case, the timing information does not have to be sent as a separate parameter to the content processing device, as it forms part of (or is embedded in) the token.

In an embodiment validating said first segment request message may comprise: using a symmetric or asymmetric decryption function for decrypting the token in the first segment request message, extracting the timing information from said decrypted token; and, checking whether said token is valid on the basis of said timing information, a clock-time and a token validity time. This embodiment allows secure generation of tokens based on the a secure algorithm and timing information so that each token is a unique value which can be used in the process of validating (including authenticating and/or authorizing) a request message requesting segmented content.

In an embodiment, generating said first validation information may comprise: generating said first token on the basis of a token algorithm and said first timing information. In another embodiment, said token algorithm may be a one-way function or an encryption algorithm.

In an embodiment said segment identifier may signal said delivery node that the request message is a refresh request message for generating new validation information for the segment identified in the request message. This way, a safe and robust token-based validation method may be achieved which does not require validation information, such as tokens, to be valid for a long period of time and which does allow a user to temporarily stop the play-out of segments.

In an embodiment said first validation information may be temporarily stored in a memory of said content processing device for use in a further second segment request message.

In an embodiment at least part of said manifest file may comprise one or more preformatted uniform resource locators (or parts thereof) associated with said segment identifiers, wherein a preformatted Uniform Resource Locator (URL) may comprise one or more predetermined positions for inserting validation information (e.g. a token and, optionally, timing information). The preformatted URL may for instance relate to a URL Template, or URL with space for one or more additional URL parameters or query parameters (e.g. URL query or query string). Validation information (e.g. a token may thus also be referred to as a URL parameter or Query Parameter.

In an embodiment said at least one at least one delivery node may be part of a content delivery network (CDN) comprising at least one request routing node and one or more delivery nodes for delivering segments to one or more clients. In an embodiment said request routing node and/or at least part of said delivery nodes may be associated with or part of an validation module for validating request messages on the basis of validation information. As the method uses a stateless protocol, the method is especially suitable for situations wherein different segments are being delivered by different delivery nodes. No state or session information is necessary on the server-side to execute the validation process.

In a further embodiment a first part of said segmented content item may be delivered by a first content delivery network and a second part of said segmented content may be delivered by a second delivery network. In one embodiment said first and second content delivery networks may be configured to exchange information on the token-based validation method to be used by said first and second CDN. In an embodiment said information may include: identification of the token algorithm, a token validity time, secret information (a seed) for generating a token or an encryption key; and/or, a token refresh policy.

In one aspect, the invention may relate to a content delivery network system configured for enabling token-based validation of the delivery of at least part of a segmented content item to one or more content processing devices, said segmented content item being associated one or more segment identifiers, preferably at least one manifest file comprising one or more segment identifiers, wherein said system may comprise: at least one delivery node for receiving a first segment request message from a content processing device, said first segment request message comprising a first segment identifier associated with a first segment; and, for sending a first response message and first validation information for validating a second segment request message to said content processing device; and, at least validation module configured for generating said first validation information, comprising at least a first token and first timing information, preferably a first clock-time, wherein said first timing information is associated with the processing of said first segment request message by said at least one delivery node.

In a further aspect, the invention may relate to a validation module for use with a content delivery network as described above, wherein said module may comprise a token algorithm and is configured for: receiving first validation information associated with a first segment request message received by said content delivery network, said first validation information comprising at least a first token and first timing information associated with the processing of said first segment request message by said content delivery network; associating at least one segment identifier in a first segment request message with a predetermined content collection identifier; and, validating a second segment request message on the basis of said first validation information, said predetermined content collection identifier and said token algorithm.

In an embodiment, said validation module may be further configured for: generating second validation information comprising at least a second token and second timing information associated with the processing of said second segment request message by said content delivery network.

In a further aspect, the invention may relate to a content processing device for use with a content delivery network as described above, wherein said content processing device may be configured for: receiving validation information for validating a segment request message by the content delivery network, wherein said validation information comprises at least one token and timing information; determining a segment identifier and an associated uniform resource locator of a delivery node, preferably on the basis of at least part of a manifest file stored in a memory of said content processing device; and, sending a segment request message and said validation information to said content delivery network.

In yet a further aspect, the invention may relate to a data structure, preferably at least part of a manifest file for use by a content processing device as described above, wherein said data structure enables token-based validation of segmented content delivered by a content delivery network to said content processing device, and wherein said data structure may comprise one or more segment identifiers; and, location information for locating one or more delivery nodes configured to deliver one or more segments associated with said one or more segment identifiers to a client; and wherein said data structure may further comprise one or more preformatted uniform resource locators associated with said segment identifiers, wherein a preformatted uniform resource locator comprises one or more predetermined positions for inserting validation information, preferably a token and, optionally, timing information, by said content processing device.

The invention may also relate to a program product, a computer program product comprising software code portions configured for, when run in the memory of a computer, executing the method steps as described above. The invention will be further illustrated with reference to the attached drawings, which schematically will show embodiments according to the invention. It will be understood that the invention is not in any way restricted to these specific embodiments.

DETAILED DESCRIPTION

Figure 1:
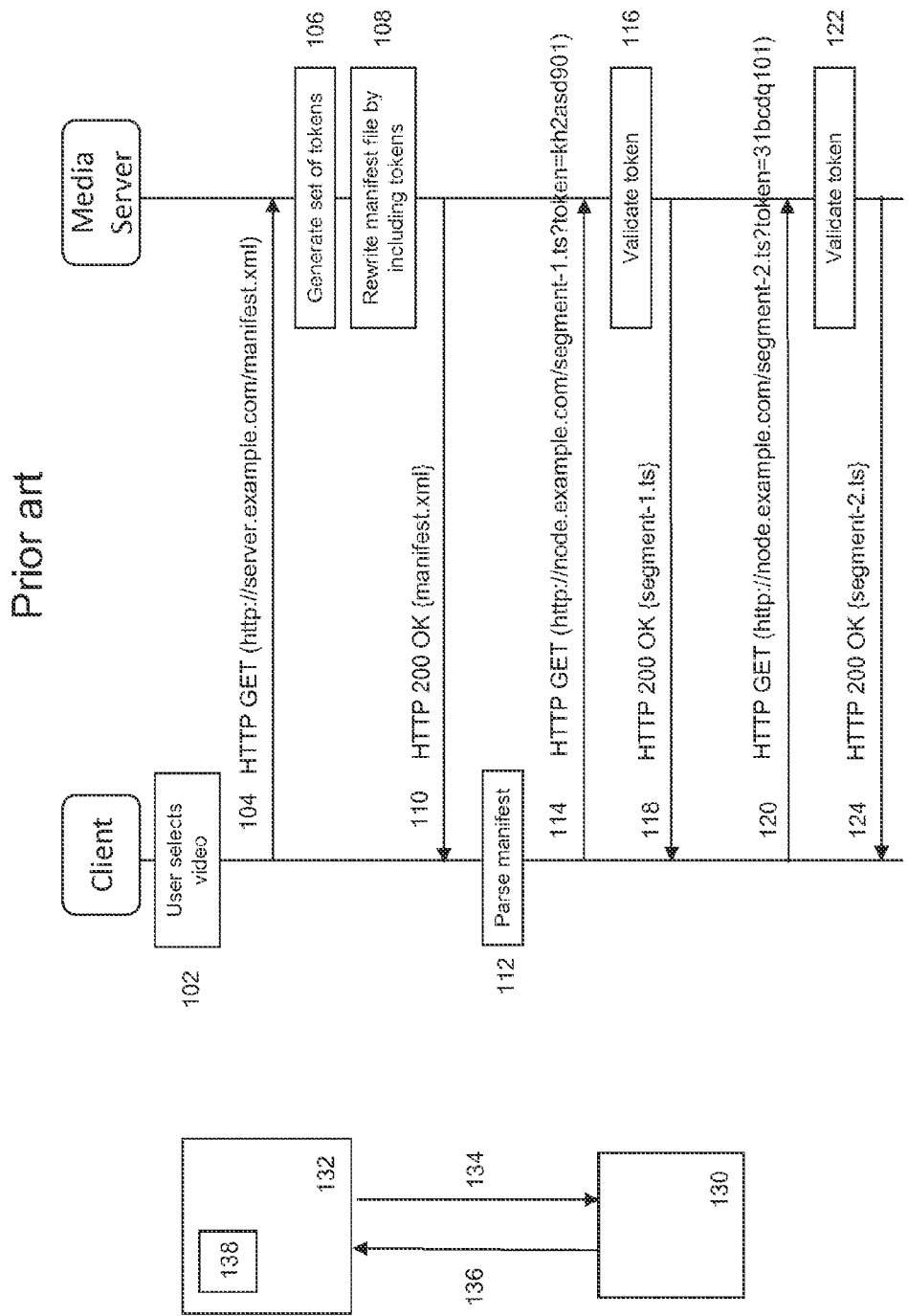
FIG. 1 depicts a known HAS protocol flow between a client and a delivery node.

FIG. 1 depicts an overview of a protocol flow of a known token-based validation process between a client 130 in a content processing device and a delivery node 132, e.g. a delivery node, which is configured to deliver segmented content items to the content processing device. A stateless streaming protocol, such as HAS streaming protocol, based on request and response protocol messages 134,136 is used in order to control the streaming process between the client and the delivery node. Here, a content processing device may generally relate, e.g. a (mobile) content play-out device such as an electronic tablet, a smart-phone, a notebook, a media player, a home gateway or DASH enabled devices such as a DASH-enabled HbbTV display device. Alternatively, a content processing device may be a set-top box or content storage device configured for processing and temporarily storing content for future consumption by a content play-out device. Similarly, the delivery node may be part of or associated with a content provider or a content delivery network (CDN). Content processing devices may generally contain a microprocessor, memory and optionally hardware circuitry, for storing and running program instructions for executing parts of the method according to the invention. In a first step 102, a user may obtain the right to access a content item. For example, the customer may buy a video title via a website of a content provider. After obtaining the access right, the customer may—at some point in time—decide to watch the video by instructing a client in the content processing device, e.g. by pressing a play button, to send a first segment request message, e.g. an HTTP GET request message, to a delivery node in order to obtain a manifest file (step 104) from a delivery node.

The manifest file constitutes a special data structure which may comprise segment identifiers, e.g. segment file names, forming at least part of a segmented video file. The manifest file may further comprise location information, e.g. URLs, associated with a segment identifier for locating one or more network nodes, which are configured to deliver the segments (which are sometimes also referred to as chunks) to a client (in this disclosure such network nodes may be referred to as delivery nodes); or, alternatively, to a network node that is able to determine one or more network nodes which may be able to deliver an identified segment. The location information may point to different locations on a network node. For example, URLs associated segments may point to different folders defined in one delivery node.

In some cases, a manifest file may comprise one or more segment identifiers but no location information. In that case, the segment identifier may be resolved in the network using e.g. known techniques like DNS in order to determine location information associated with a segment identifier. The manifest file may further comprise information describing the temporal and/or spatial relation between the segments. Such file may be stored and identified using a specific file name extension, e.g. *.mf, *.xml and *.m3u8.

In response to the reception of the request, a validation module 138 associated with the delivery node may generate a set of tokens (step 106) and rewrite the manifest file so that the tokens are included in the manifest file (step 108).

In this disclosure, a token may refer to a value, preferably a unique value, (e.g. a string of bits, hexadecimal values, alpha-numeric characters and/or any other suitable information carrier for representing a such (unique) value) that is used in the process of validating a segment request message originating from a content processing device, wherein the segment request message is used for requesting a segment or a manifest file from the network, in particular from a delivery node in a network, e.g. a content distribution network (CDN). Further, in this disclosure, a module and a client may be implemented as a software program, a hardware device or a combination of a software program and a hardware device.

Although in this disclosure, the term segment is used, it may be substituted for the purpose of this invention by functionally equivalent terms such as "fragment" or "chunk". All these terms relate to defined pieces of data of a segmented stream of data, identifiable through a manifest file or the like.

After rewriting the manifest file, the delivery node may send the manifest file including the set of tokens to the client in a response message, e.g. an HTTP 200 OK message (step 110). The client thereafter parses the manifest file to obtain the locations of the segments associated with the requested video (step 112).

The client may parse the manifest file in order to extract the URL associated with the first segment node.example.com/segment-1.ts and an associated token kh2asd901 (step 114) and requests the first segment of the video from the location described in the manifest file by sending a request message, e.g. a HTTP GET request message, comprising an segment identifier, e.g. the segment file name, to the address associated with the URL. The request may also comprise the token so that upon reception of the request, the delivery node may first validate the token (step 116) before it sends the requested segment to the client. Once the token is validated by the validation module, the delivery node may send the requested segment to the client (steps 118) in an (HTTP 200 OK) response message. The process of requesting a segment (step 120), validating the request on the basis of a token in the request (step 122) and sending the requested segment to the client (step 124) may be repeated for a number of segments or for all segments of the video.

As already discussed earlier, the problem associated with this token-based validation scheme for segmented content is that it requires the tokens to be valid for a long period of time, since there may be long period between the generation of the manifest file with the tokens and the client requesting a last segment. This token-based validation scheme is therefore sensitive to replay attacks and the threat of deep-linking.

Figure 2:
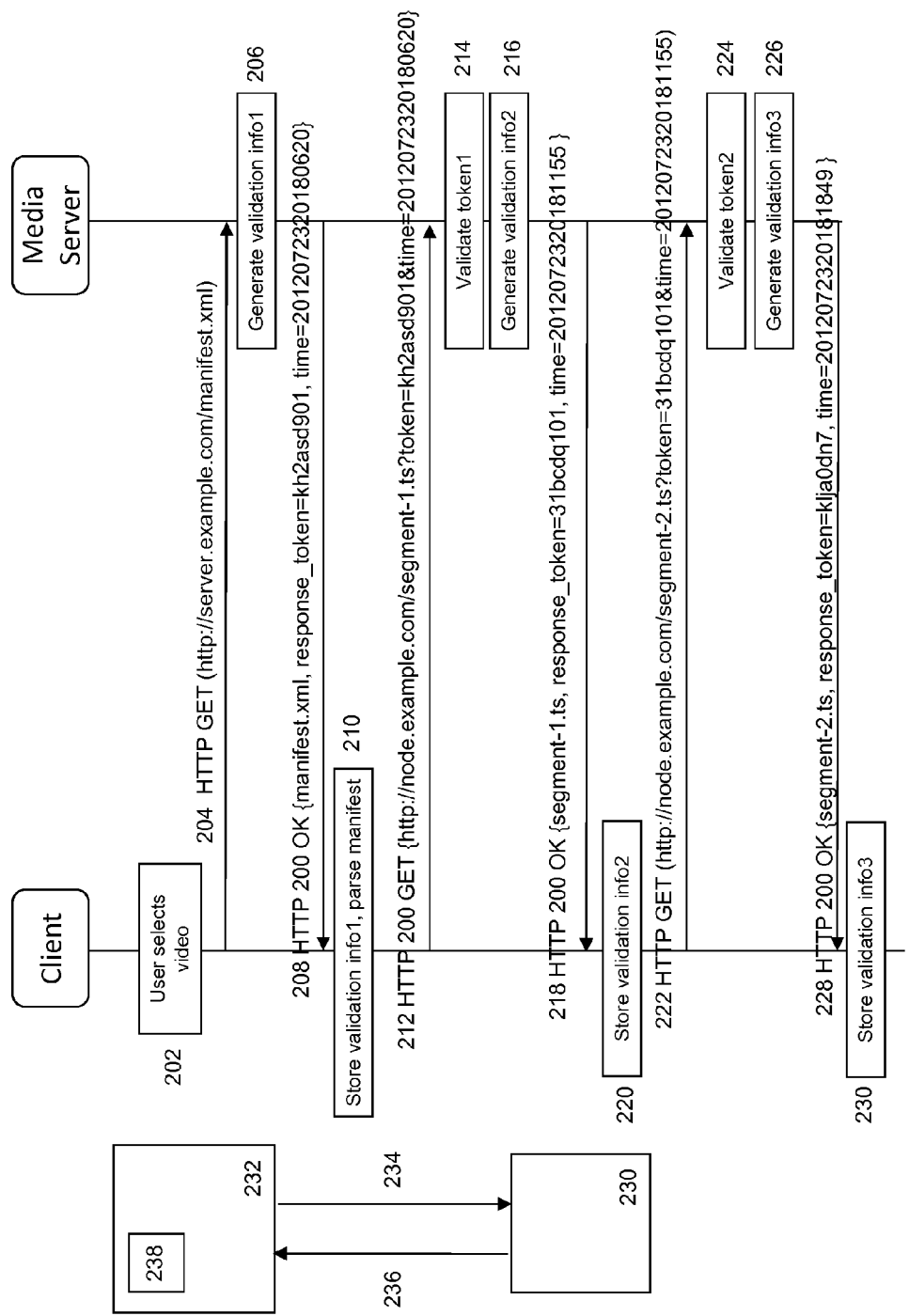
FIG. 2 depicts a protocol flow of a token-based validation method according to one embodiment of the invention.

FIG. 2 depicts a protocol flow of a token-based validation process according to one embodiment of the invention. In particular, FIG. 2 depicts a protocol flow associated with a streaming protocol such as an (HTTP) adaptive streaming (HAS) protocol for streaming content from a delivery node 232 to a client 230 in a content processing device. The client may be configured to communicate with a network node, e.g. a delivery node, and enable streaming of content on the basis of an adaptive streaming protocol, e.g., Apple HTTP Live Streaming [http://tools.ietf.org/html/draft-pantos-http-live-streaming-07], Microsoft Smooth Streaming [http://www.iis.net/download/SmoothStreaming], Adobe HTTP Dynamic Streaming [http://www.adobe.com/products/httpdynamicstreaming], 3GPP-DASH [TS 26.247 Transparent end-to-end Packet-switched Streaming Service (PSS); Progressive Download and Dynamic Adaptive Streaming over HTTP] and MPEG Dynamic Adaptive Streaming over HTTP [MPEG DASH ISO/IEC 23001-6].

The protocol flow may start in a similar way as described with reference to FIG. 1. A user may obtain the right to access a content item (step 202). For example, the customer may buy a video title via a website of a content provider. After obtaining the access right, the customer may—at some point in time—decide to play-out the content item by instructing the client in a content processing device, e.g. by pressing a play button, to send a first segment request message, e.g. an HTTP GET request message comprising an identifier, e.g. a (content) file name (manifest file identifier), associated with a manifest file, to a delivery node in order to obtain a manifest file (step 204). Optionally in embodiments of the invention, the access right may be validation information such as a token and may be sent with the first segment request message, if this message is a request for a manifest file. In response to the reception of the segment request message, the validation module 238 associated with the delivery node may generate first validation information comprising a first token and first timing information (step 206), which may be used to validate a subsequent segment request message, which is sent from the content processing device to the delivery node.

To that end, the validation module may comprise a predetermined token algorithm for generating a token on the basis of timing information. Here, timing information refers to information identifying a time associated with the processing of a request for content originating from a content processing device, e.g. a timestamp associated with an event in the processing of the request message by the delivery node or the validation module associated with the delivery node. Such event may for example include: the reception or parsing of the request by the delivery node, the validation of the request or the (start of the) generation of a token for a subsequent request. In embodiments of the invention, the timing information may be an implicit or explicit part of the token. In some embodiments, a token validity time, indicating a maximum period that the token can be validly used, may be added to the timestamp so that the validation module may simply check the expiry of a token by comparing the timing information with the wall clock time.

In one embodiment, the token algorithm in the validation module may be based a one-way (hash) function such as the well-known MD5 or SHA-1 algorithms. A one-way function allows easy and efficient computation of a token (hash value) on every input value, but is very hard to invert. A token may be generated on the basis of an one-way function using at least timing information as an input parameter.

In order to increase the strength of the authentication method, further information may be used as an input parameter for the one-way function. For example, in an embodiment, secret information, e.g. a secret key or a random number generated by a pseudorandom number generator and a seed for initializing the pseudorandom number generator, may be used as a further input parameter. Such secret key may improve the security of the token algorithm. In various other embodiments, (part of) an identity, e.g. the IP address of the content processing device or a network node; and/or, (part of) the name of the file (e.g. a segment file or the manifest file) that is delivered to the client may be used as input parameters for the one-way function. The use such parameters allows the generation of a token which is specifically tied to the identity of the content processing device, a segment and/or a particular set of segments.

In a further embodiment, a token may be generated using a known cryptographic algorithm, e.g. an encryption algorithm E (cipher) and associated encryption key e. The cryptographic algorithm may comprise a symmetric encryption algorithm such as AES or DES or an asymmetric (public key) encryption algorithm such as RSA. Before encryption, an secret algorithm may be used to combine the timing information with other information as described above, in particular an identity associated with the content processing device such as (part of) an IP address, into a value V in which the timing information is embedded. The value V may then be encrypted on the basis of the cipher and the encryption key. The result, a string of characters and/or numbers representing the encrypted information, may be used as a token.

The thus generated a first token may be sent to the client along with a response message. For example, as shown in FIG. 2, a token, the hash value kh2asd901, may be generated on the basis of a one-way function wherein timing information (a clock-time 2012072320180620 according to the format YYYYMMDDHHIISS) and a secret key are used as input parameters. The token and the timing information may be sent as first validation information (auth info) to the content processing device (step 208).

Although in the example of FIG. 2, the token and timing information are sent as separate parameters to the content processing device, other implementations are also possible. For example, the authentication module may be configured to combine the token and the timing information into a further token in which the timing information is embedded.

In one embodiment, the validation information may be sent in a first response message (comprising in this case the requested manifest file) to the client. The first validation information may be inserted into the response message as part of the header of the message, e.g. an HTTP header. In another embodiment, the first validation information may be sent in a separate message to the content processing device, or as part of the manifest file.

In embodiments of the invention, when the first validation information is sent as part of the manifest file, it may be associated with one or more segment identifiers, wherein said segment identifiers may refer to different representations (streams) of the segmented content. This allows for a selective use of the invention for specific representations referenced in the manifest file (e.g. only high quality/high bitrate representations/streams).

The client in the content processing device may receive the response message and the first validation information, e.g. the first token and, optionally, the first timing information, and temporarily store (buffer) the first validation information in a memory for use with a subsequent second segment request message. Then, if a user decides to retrieve content associated with the manifest file, the client may parse the manifest file in order to obtain location information, comprising a reference, e.g. an URL, where the content, e.g. the first segment, is stored in the network (step 210). Thereafter, the client may send a second segment request message, e.g. HTTP GET request message comprising an segment identifier associated with a second segment, and the first validation information to an IP address of the delivery node (which may be obtained by resolving the URL) (step 212).

In an embodiment, the first validation information may be sent to the delivery node in the second segment request message. The first validation information be inserted into the second segment request message in several ways. In one embodiment, the first validation information may be sent to the client as part of the URL. In one embodiment, the segment URLs that are listed in the manifest file, which is delivered to the client, may comprise template URLs, i.e. preformatted URLs, wherein an URL may comprise a marked section allowing a client to determine where to insert the token and the timing information into the URL. For example, a template or preformatted URL may look like: node.example.com/segment-1.ts?token=%TOKEN%&time=%TIME%, wherein the marked token position %TOKEN% in the template URL may be replaced with a generated token and the marked time position %TIME% in the template URL may be replaced with a clock-time associated with the generated token. The template URL may comprise only a marked token position, in case the timing information is embedded in the token.

In further embodiments, the token and/or the timing information may be part of the header of the request. In yet another embodiment, the token may be inserted in the URL and the timing information may be part of the header of the request or vice-versa.

Upon reception of the second segment request message, the validation module associated with the network node, in this example a delivery node, may receive the first validation information in order to validate the second segment request (step 214). To that end, the validation module may execute a validation process wherein the request is authenticated on the basis of the token and the timing information and wherein it is checked whether the token is still valid (not-expired) or in other words whether the client is authorized to access the content item.

In case the validation scheme is based on a one-way function, the validation module may calculate a reference token, e.g. a reference hash, using the one-way function, the first timing information and, optionally, further information such as secret information and information associated with the request including the IP address of the user and/or (part of) the file name. Thereafter, the reference token and the first token in the validation information may be compared and checked for similarity. The results are not identical or sufficiently similar, the validation module may determine that the request originates from an unauthorized source so that the delivery of the requested segment is refused.

If the reference token and the first token are identical or sufficiently similar, the validation module may check whether the token is not expired. For example, in one embodiment, the validation module may compare the first timing information with the wall clock time and determine whether the period between the first timing information and the wall clock time has exceeded the token validity time. If the period exceeds the token validity time, the token is expired. In that case, the validation module will signal that the validation process was not successful so that the delivery node will refuse the delivery of the requested segment. If a customer in that case would like to view the content item, the process in FIG. 2 needs to be repeated from start in order to determine whether the customer still has the right to access the content item.

In case the validation scheme is based on an encryption scheme, a decryption function and a decryption key in the validation module may be used to decrypt the first token associated with the first segment request message. Thereafter, the first timing information may be extracted from the decrypted token and checked on the basis of the wall clock time and a token validity time in a similar way as described above.

If it is determined that the token is not expired (indicating that the client is authorized to access requested content), the validation module may determine that the validation process was successful. In that case, the validation module may generate second validation information comprising a second token and second timing information (e.g. hash value 31bcdq101 and clock time 2012072320181155) (step 216) wherein second timing information is associated with the processing of said first segment request message. In an embodiment said second timing information may be associated with the generation of said second token, e.g. the time that the second token is generated. The second validation information and the requested segment may be sent back to the content processing device (step 218).

In one embodiment, the second validation information may be inserted in a response message, e.g. a HTTP 200 OK message, which is sent to the client in a similar way as described with reference to the first response message. Thereafter, client may temporarily store (buffer) the second validation information for use in a subsequent third segment request message (step 220) and start the play-out of the received segment.

The process of sending a request for a segment together with (second) validation information to a delivery node (step 222), validating the request on the basis of the token and the second validation information (step 224), generating third validation information (step 226), sending the requested segment and the new token and third validation information to the client (step 228) and temporarily storing the third validation information (step 230) may be repeated for a number of segments or for all segments of the content item.

One advantage of the above-described method is that it provides a token-based validation scheme, which is particularly suitable in situations where different segments are being delivered by different delivery nodes, since no state or session information is necessary on the server-side to execute the process. It does not need generation and maintenance of state information or session information between network nodes and/or clients thereby reducing the complexity of the system and increasing its robustness. Another advantage of the system is that a token only has to be valid for a relative short amount of time. As a client will typically request new segments every 5-30 seconds, a token only has to be valid for that amount of time (depending on segment length). This way the system is less sensitive to replay attacks.

In certain situations, a token may stay in the memory for some time before it is used in a subsequent request message. For example, a user may decide to "pause" the display of content or a client may have buffered enough segments so that it does not have to request a new segment for some time. In that case, there may be a risk that a token which is stored (buffered) in a memory of the content processing device for a period which is longer than the token validity time so that the token expires. In order to counter this problem, the client may comprise a "refresh" mechanism in order to refresh the token. Without such refresh mechanism, the validation information stored at the client would expire, and subsequent future requests for segments would be rejected by the delivery node.

Therefore, in an embodiment, a client may be configured monitor the period a token is stored (buffered) in the memory. If the monitored period approaches the token validity time, the client may determine that the token needs to be refreshed. In that case, the client may generate a "null" or refresh request message and send it to the delivery node. Such request message may be similar to a normal (segment or manifest file) request message, comprising a special identifier, a refresh identifier, for signaling the validation module that the client would like to receive new validation information.

In one embodiment, the identifier for signaling a refresh request message may be included in an URL. For example, the reference to a null segment in a refresh URL node.example.com/video/null_segment?token=%TOKEN%&time=%TIME% may trigger the validation module to send new validation information to the client. In that case, the null segment locator is used as an identifier for signaling the validation module in the delivery node that a token needs to be refreshed and that no segment needs to be delivered to the client.

The delivery node may reply to the refresh request message with an "empty" or refresh response message, e.g. an HTTP 200 OK message, comprising new validation information including a newly generated token. This way, a safe and robust token-based validation method may be achieved which does not require validation information, such as tokens, to be valid for a long period of time and which does allow a user to temporarily stop the play-out of segments.

In one embodiment, an authentication module is configured to only process a maximum number of consecutive refresh request messages associated with one segment. Further refresh requests are refused if the number of consecutive refresh messages is exceeding a maximum number $N_{max}$. This way, misuse of the refresh mechanism is minimized.

As already referred to above, the token-based validation method according to the present invention is particularly suitable for implementation in a CDN-based content delivery system.

Figure 3:
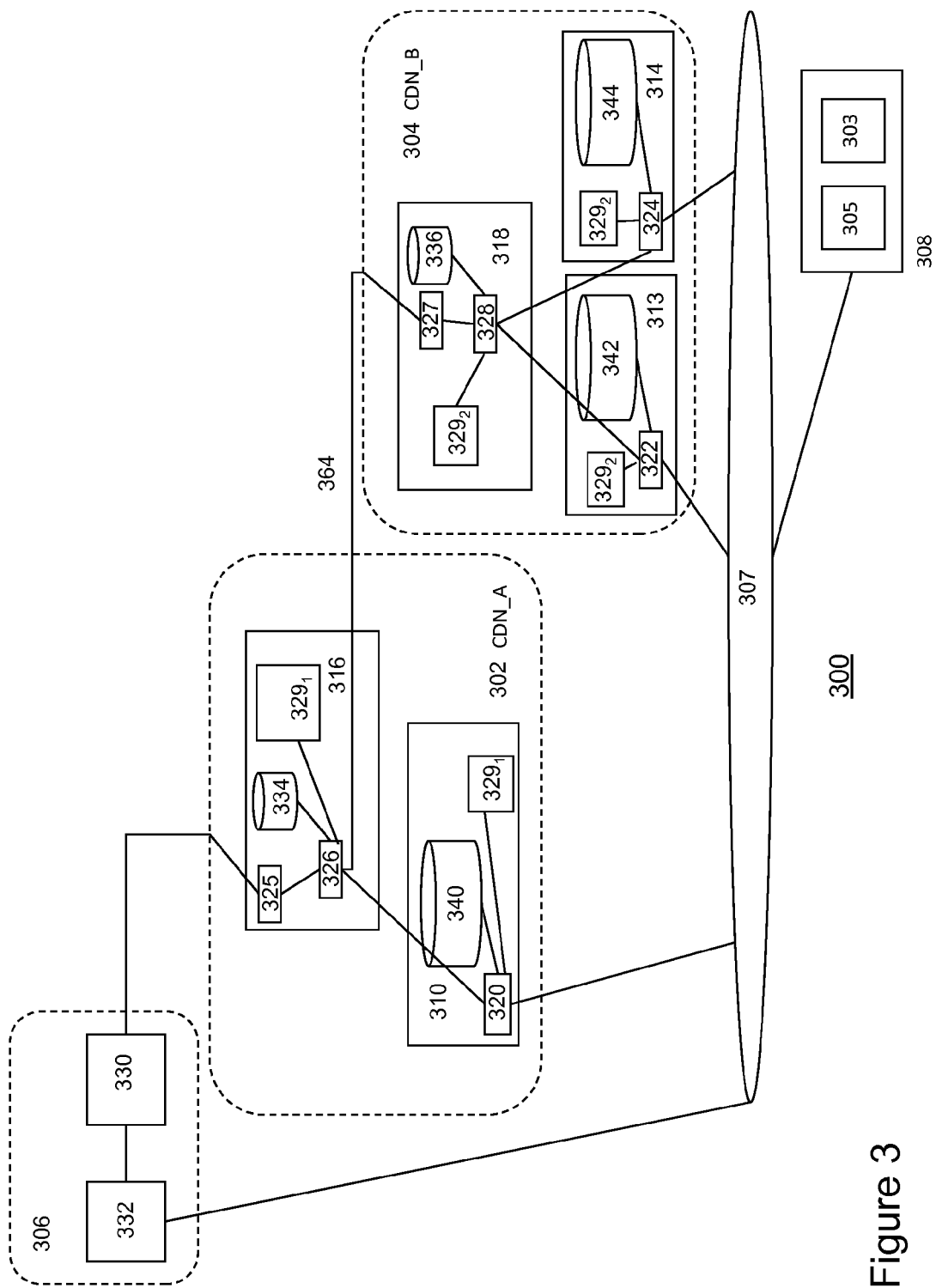
FIG. 3 depicts a CDN-based content delivery system configured for executing a token-based validation method according to an embodiment of the invention.

FIG. 3 depicts a CDN-based content delivery system configured for executing a token-based validation method according to an embodiment of the invention. The content delivery system may comprise one or more CDNs, e.g. a first CDN 302 and a second CDN 304, and at least a content source 306 connected via a transport network 307 to one or more content processing devices 308 hosting a client 303. Here, the client may comprise or be associated with a token-manager 305 configured for: extracting validation information, i.e. a token and timing information, from response messages it receives from the content delivery system, storing the validation information for use in a subsequent request message; and, inserting the validation information in a request message for authentication the request message to the CDN. In some embodiments, the token-manager may be further configured for sending a refresh message to the CDN in order to request new validation information.

A CDN may comprise different network nodes, including one or more delivery nodes (also referred to as CDN surrogate nodes or CDN surrogates) 310,313,314 and at least one central CDN node 316,318. A delivery node may comprise or be associated with a controller 320,322,324 and a cache 340,342,344 for storing and buffering content and, optionally, manifest files associated with video titles stored at the various delivery nodes in the CDN. Further, a central CDN node may comprise or may be associated with an ingestion node (or content origin function, COF) 325,327 for controlling ingestion of content from an external source (e.g. a content provider or another CDN), a content database 334,336 for maintaining information about the content, e.g. segment identifiers and information where segments and manifest files are stored within a CDN; and, a CDN control function (CDNCF) 326,328 for controlling the distribution of one or more copies of the content to the delivery nodes and for redirecting clients to appropriate delivery nodes (a process also known as request routing). In this disclosure, the node hosting the CDNCF may be referred to as a CDN request routing (RR) node.

A customer may purchase content, e.g. video titles, from a content provide (CP) 330 by sending a request to a web portal (WP) 332, which is configured to provide title references identifying purchasable content items. The CDNCF may manage the locations (i.e. the delivery nodes and the locations (e.g. folders) on a delivery nodes) where segments may be retrieved using the content database 334,336.

A CDN 302, 304, preferably a delivery node 310, 313, 314 or CDN RR node (in this FIG. 3 the central CDN node 316, 318) associated with such CDN, may further comprise at least one validation module $329_1,329_2$ for authenticating and authorizing requests sent to the CDN on the basis of validation information. The validation module may be configured to: receive validation information associated with a request message, for example a request message from the client received by the CDN RR node 326 requesting a manifest file or a request message from the client received by a delivery node (or CDN surrogate) 310 requesting a segment. Further, the validation module may be configured to authenticate and authorize a request sent to a delivery node or the CDN RR node on the basis of the token and the validation information.

Furthermore, the validation module may be configured to generate new validation information, including a new token and timing information. To that end, the validation module may comprise a predetermined token algorithm for generating a token on the basis of timing information, preferably a wall clock time, associated with the processing of a request for content by the CDN.

The token may be generated on the basis of any suitable token-generating algorithm, including a one-way function or an cryptographic algorithm. Further information such as secret information (random seed), an identity (such as IP address) of the user an/or (part of) the name of the file (e.g. a segment file or the manifest file) that is delivered requested by a client may be used to generate a token. The validation module may be configured to generate validation information and validate tokens on the basis of the validation information in a similar way as described with reference to FIG. 2.

In one embodiment, a validation module may be associated with (communicatively connected to) one or more delivery nodes and/or the CDN RR node. In another embodiment, delivery nodes (CDN surrogates) and/or the CDN RR node may each be provided with a validation module.

In an embodiment, first and second CDNs may be interconnected via a CDN interconnect interface 364. In that case, the first CDN (the upstream CDN) may outsource part of the delivery of segments to a client to the second CDN (the downstream CDN). For example, in one embodiment, low-quality segments may be located and delivered by a first CDN A (configured e.g. for delivery of content to mobile devices) and high quality segments may be located and delivered by a second CDN B (configured e.g. for delivery of high-quality segments to home media devices supporting HDTV technology). Hence, in that case a client may receive a manifest file comprising URLs associated with a first CDN and second CDN.

In some situations, segments may be delivery by multiple CDNs, e.g. some segments of a content item are delivered by the first CDN A and some other segments are delivered by the second CDN B. In this embodiment, the CDNs may exchange interCDN token information over an CDN interconnect interface. InterCDN token information is information that is necessary for a group of CDNs to perform a predetermined token-based validation method. The interCDN token information may include: the information about the mechanism that is used to calculate the token, e.g. clock-time, IP address, segment identifier (e.g. segment name), the location where a segment can be retrieved, CCI, etc.; the type of one-way function used (e.g. MD5, SHA-1, . . . ), shared secret information, e.g. a seed which is used in the generation of a token or an encryption or decryption key; the type of encryption used (AES-128, AES-256, . . . ); the token validity time; the policy regarding token refresh (e.g. a token may be refreshed for a maximum number of times); one or more content collection identifiers (CCIs, which are discussed in more detail with reference to FIG. 6) associated with segments which are outsourced to the second (downstream) CDN.

Figure 4:
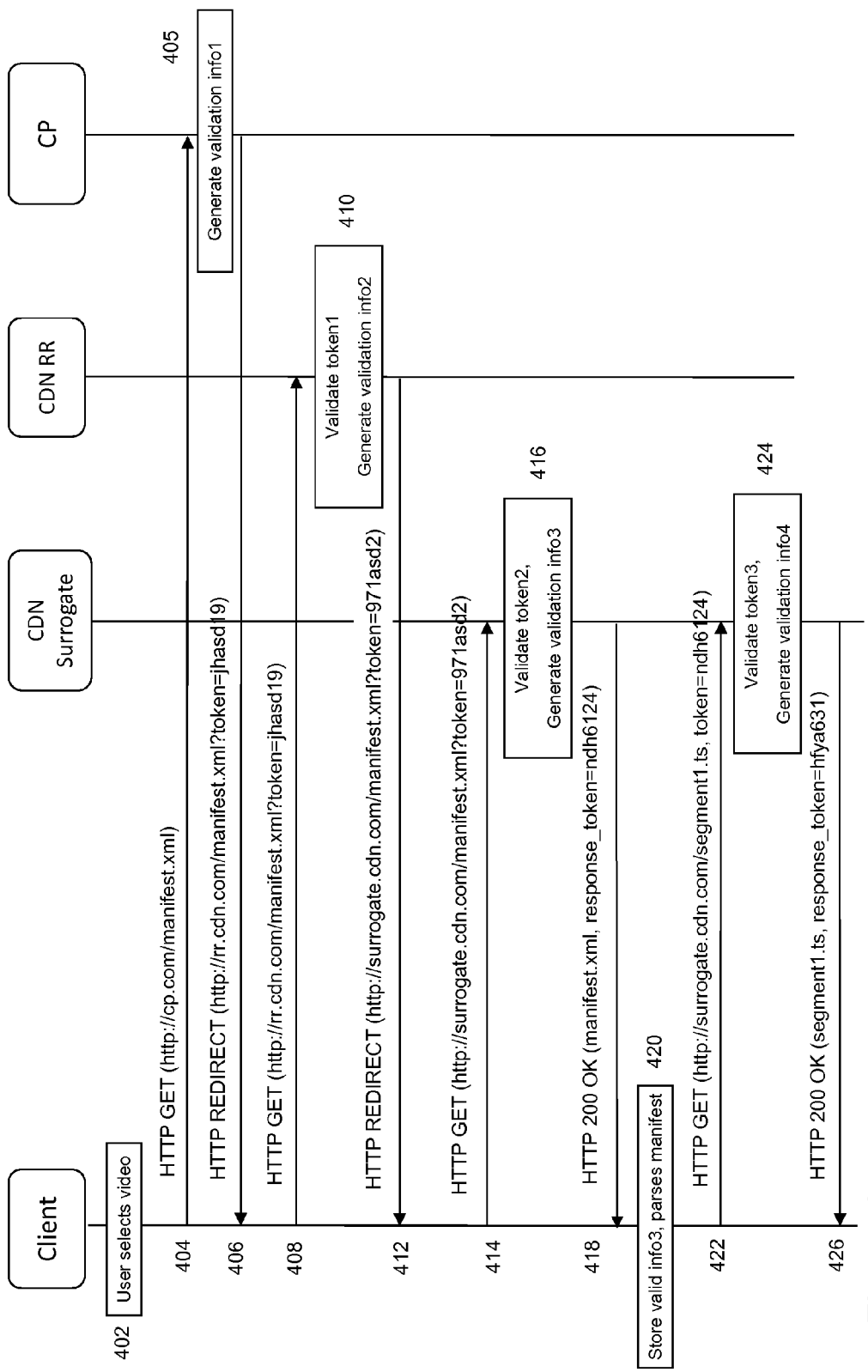
FIG. 4 depicts a protocol flow of a token-based validation method according to another embodiment of the invention.

FIG. 4 depicts a protocol flow of a token-based validation method according to one embodiment of the invention. The process may start with a customer obtaining the right to access a content item (step 402). For example, the customer may buy a video title via a website of a content provider. After obtaining the access right, the customer may—at some point in time—decide to view at least apart of the content item by instructing the client in the content processing device to send a first segment request message to the content provider in order to request a manifest file associated with the purchased video title (step 404). The content provider may generate first validation information, comprising a first token and a first timing information (step 405), and send a first response message, e.g. an HTTP redirect message comprising location information (e.g. an URL) of a CDN network node (such as a CDN RR node), back to the client (for reasons of brevity timing information is not illustrated in FIGS. 4 and 5). In an embodiment, the validation information and location information, e.g. an URL of a CDN RR node or a CDN surrogate (a delivery node) (step 406) is inserted in the response message.

In response to the redirect message, the client may use the URL of the CDN RR node to send a new, second segment request message for the manifest file together with the first validation information to the CDN RR node (step 408). Upon reception of the second segment request message, an validation module associated with the CDN RR node may use the first validation information in order to validate the second segment request message (in a similar way as described with reference to FIG. 2); and, generate new second validation information including a second token and second timing information (step 410). The CDN RR may further determine location information (e.g. an URL) of a CDN surrogate comprising the requested manifest file. The location information and the second validation information may be subsequently sent in a second response message, in this case a HTTP redirect message, to the client (step 412).

The client again may use the URL of the CDN surrogate in the redirect message in order to send a third segment request message for a manifest file and the second validation information to the CDN surrogate (step 414). Upon reception of the third segment request message, a validation module associated with the CDN surrogate may use the second validation information in order to validate the third segment request message (in a similar way as described with reference to FIG. 2). The CDN surrogate may then retrieve the manifest file from a database, e.g. the content database of the CDN, and receive new, third validation information from the validation module (step 416). A third response message, comprising the manifest file, and the third validation information are then sent to the client (step 418). When receiving the third response message, the client may store the manifest file and the third validation information, which is used for validating a future fourth segment request message. Once the user decides to play-out the video title, the client may parse the manifest file and retrieve location information (e.g. an URL) associated with a first segment (step 420). A fourth segment request message, comprising this location information, and the stored third validation information are then sent in a request message to the CDN surrogate (step 422). When the CDN surrogate receives the fourth segment request message for a segment, the validation module may validate the request message on the basis of the third timing information and generate new, validation information (step 424), which is sent together with fourth response message comprising the requested segment back to the client. This process may be repeated for a number of segments or for all segments of the video.

If during the process a user temporarily pauses the play-out of the segments, the client may send a refresh request message to the CDN surrogate or the CDN RR node in order to allow proper continuation of the play-out of the video title after the pause. Such refresh message may be sent to the CDN surrogate or CDN RR node in similar way as described with reference to FIG. 2.

Figure 5:
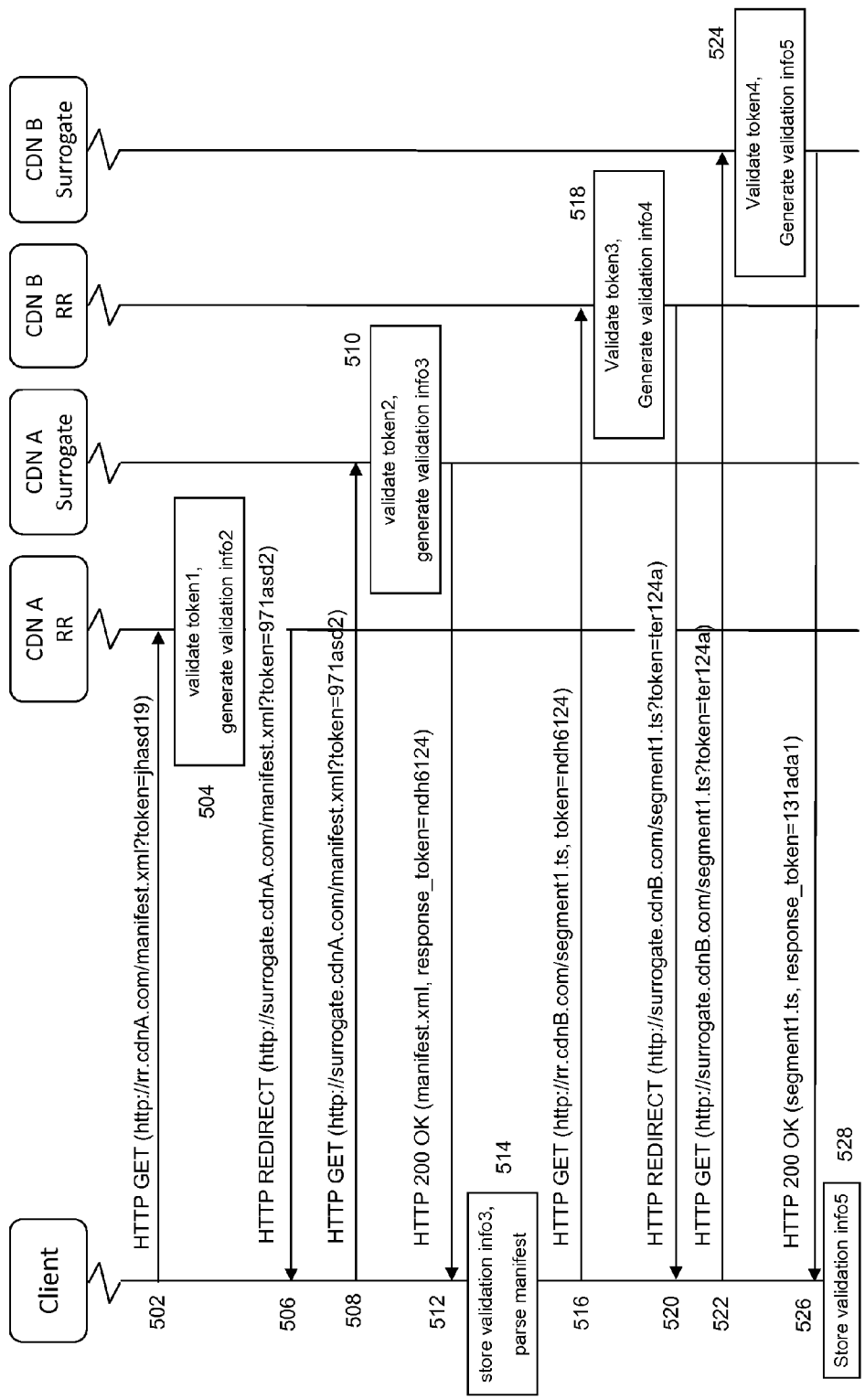
FIG. 5 depicts a protocol flow of a token-based validation method according to yet another embodiment of the invention.

FIG. 5 depicts a protocol flow of a token-based validation method according to another embodiment of the invention. In this case, delivery of the segments associated with a video title may be outsourced by a first CDN A to a second CDN B. Both CDNs may have decided to use the same token-protocol so that the validation modules in both CDNs can handle tokens.

Hence, after a customer has purchased a video title (similar to steps 404-406 described with reference to FIG. 4), the client may send a first segment request message for a manifest file and first validation information to the first CDN A, in particular to a first CDN A RR node of the first CDN A. In response, a first validation module of the first CDN A RR node may validate the first segment request message on the basis of the first validation information and generate second validation information (step 504). The first CDN A RR node may further check for the location of the requested manifest file and send a first response message, comprising the location information (e.g. the URL) associated with a first CDN A surrogate, and the second validation information back to the client (step 506). The client may subsequently use the location information in the first response message to send a second segment request message for a manifest file and the second validation information to the CDN A surrogate (step 508). A second validation module of the CDN A surrogate may validate the second segment request message on the basis of the second validation information and generate further third validation information (step 510). The CDN A surrogate may further retrieve the manifest file from a database, e.g. the content database of the CDN, and send a second response comprising the manifest file and the third validation information to the client (step 512). The client may store the manifest file and the third validation information, which will be used for validation of a subsequent fourth segment request message (step 514).

If the user decides to play-out the video title, the client may parse the manifest file in order to obtain an URL associated with a first segment. Thereafter, it may send a third segment request message for a first segment and the third validation information to the request routing node of the second CDN B (CDN B RR node))(step 516). The third validation module associated with the CDN B RR node may validate the third segment request message on the basis of the third validation information and generate fourth validation information. The CDN B RR may then determine location information, e.g. the URL, of a CDN B surrogate, and send a third response message, comprising location information, and the fourth validation information to the client (steps 518 and 520). The client may subsequently send a fourth segment request message for the segment and the fourth validation information to the CDN B surrogate (step 522). A fourth validation module may validate the fourth segment request message on the basis of the fourth validation information and generate fifth validation information. The CDN B surrogate may retrieve the requested segment and send a response message comprising the requested segment and the fifth validation information to the client, which may play-out the segment and store the fifth validation information for use in a subsequent request message (steps 524-528). This process may be repeated until all requested segments are delivered to the client.

Note that in this embodiment the manifest file only comprises a reference to the request routing node CDN B RR, which may determine per request which CDN surrogate in CDN B is selected to deliver the requested segment. This way the CDN B RR node may select a particular CDN B surrogate on the basis of some traffic and/or load information associated with CDN surrogates in CDN B. This way CDN B is able to perform load-balancing. In another embodiment, the manifest file may comprise URLs of CDN B surrogates, which are configured to directly deliver a segment to a requesting client. The protocol-flow may be implemented in any suitable adaptive streaming protocol, e.g., Apple HTTP Live Streaming [http://tools.ietf.org/html/draft-pantos-http-live-streaming-07], Microsoft Smooth Streaming [http://www.iis.net/download/SmoothStreaming], Adobe HTTP Dynamic Streaming [http://www.adobe.com/prod-ucts/httpdynamicstreaming], 3GPP-DASH [TS 26.247 Transparent end-to-end Packet-switched Streaming Service (PSS); Progressive Download and Dynamic Adaptive Streaming over HTTP] and MPEG Dynamic Adaptive Streaming over HTTP [MPEG DASH ISO/IEC 23001-6] or any derivatives of these protocols.

In conventional token-based validation schemes, the token is directly coupled to the currently requested content. In the token-based validation method according to this disclosure however, a token is generated in advance for use in the next subsequent request. However, the next segment to be requested by the client is unknown at the moment of the generation of the validation information (since the client can fast-forward, rewind or switch to a different quality level at any moment). Such token thus could be used for requesting content that is not related to the original content (e.g. for requesting segments that do not belong to the same manifest file).

In order to avoid such misuse, a so-called Content Collection Identifier (CCI) may be used during the token-based validation process. In one embodiment, the content delivery system, or the CDN RR in the content delivery system, may be configured to generate a Content Collection identifier (CCI) when a manifest file associated a video title and the segments associated with the video title are ingested. A CCI may comprise an identifier, e.g. a unique number, which links all segments (chunks) belonging to the same manifest file (representing a content collection, i.e. a collection of segments forming a video title or the like) together. The CCI associated with segments forming a content collection may be stored in the content database of the CDN. The content database may be configured receive a request associated with a predetermined segment identifier and to return a response comprising the CCI associated with the segment identifier.

A validation module associated with a CDN RR node or CDN surrogate may generate a token comprising a unique value calculated on the basis of timing information and the CCI. This way, the token is linked to a particular manifest file and all segments referred to in the manifest file. Upon receiving a request message, a CDN may check whether the CCI of the included token matches that of the segment that is being requested.

Figure 6:
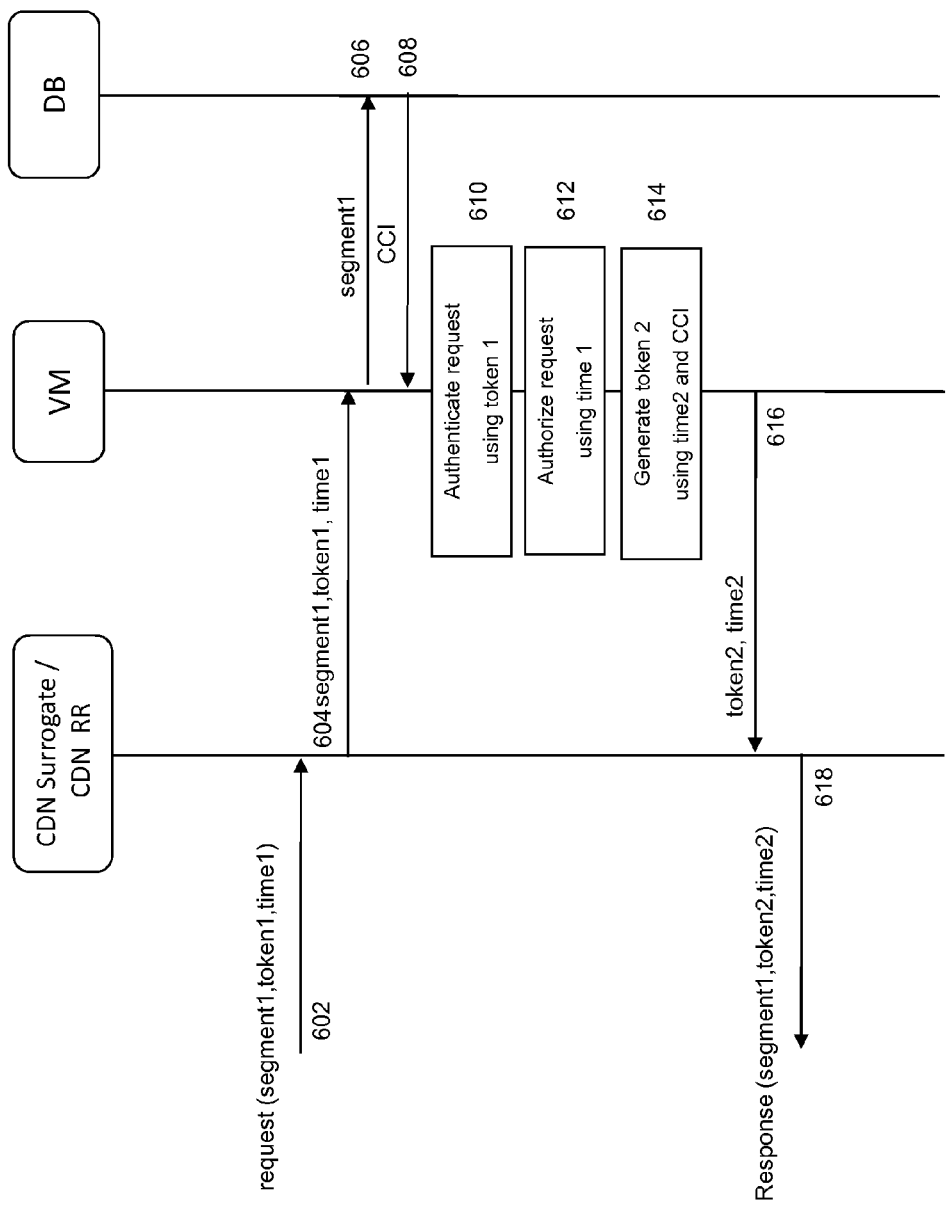
FIG. 6 depicts a protocol flow associated with at least part of a token-based validation method according to an embodiment of the invention.

FIG. 6 depicts a protocol flow associated with at least part of a token-based validation process according to an embodiment of the invention. In this case, a CDN node, e.g. a CDN surrogate or CDN RR node, associated with a validation module (AF) may receive a first segment request message for a segment or a manifest file (step 602), comprising: a segment or a manifest identifier (e.g. a file name "segment1"), first validation information associated with a first token (token1) and first timing information (time1) in a similar way as described above with reference to FIG. 2-5.

The CDN surrogate or CDN RR node may receive the first validation information and the name of the requested file and send it to the validation module (step 604). In response, the validation module may query a database DB, e.g. the content database of the CDN, on the basis of the file name in the first segment request message (step 606) and receive the CCI associated with the requested file name from the DB (if a match is found) (step 608).

Thereafter, the request message may be authenticated on the basis of the first token (step 610). For example, a reference token may be calculated on the basis of a token algorithm using at least the first timing information and the CCI as input. In addition, other information, e.g. (part of) file name and/or IP address of the content processing device may also be used as input to cryptographic algorithm. The reference token may be checked for similarity with the first token in the first validation information.

If the validation module determines that there is sufficient similarity, it may check whether the requestor is authorized to receive the requested information (step 612). For example, it may check whether the token has not expired using the first timing information and a token validity time.

If the token is valid, the validation module may determine a further second token (token2) on the basis of second timing information (time2) associated with the generation of said second token, the CCI and, optionally, (part of) a file name or IP address (step 614) and return the new validation information, i.e. the second token and second timing information, to the CDN surrogate or CDN RR node, which will use the new validation information in a response or redirect message (step 616). Hence, when using the CCI during the token-based validation, the token cannot be used for requesting other, not related segments. This way certain misuse of validation information can be reduced.

Figure 7:
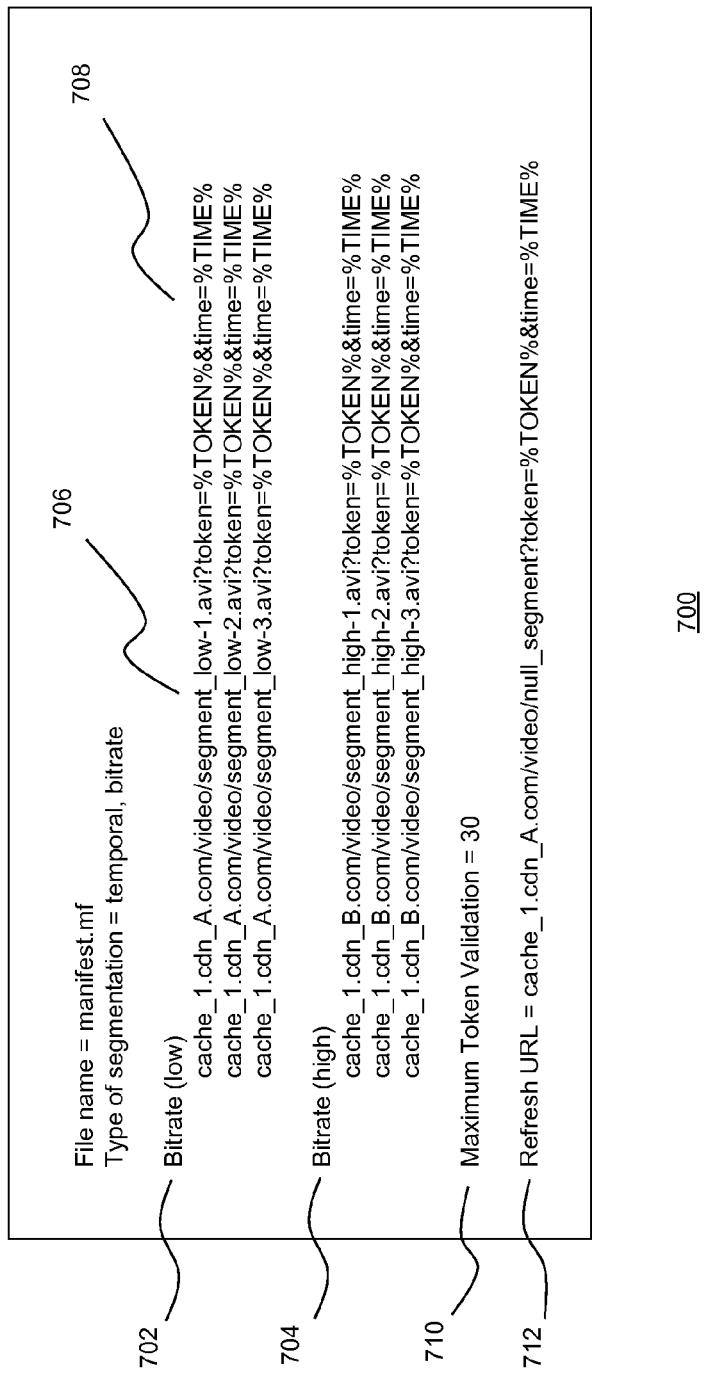
FIG. 7 depicts a manifest file according to an embodiment of the invention.

FIG. 7 depicts a schematic of a manifest file data structure 700 according to an embodiment of the invention. The manifest file is used by a client to locate delivery nodes and to retrieve segments on the basis of the information in the manifest file. To that end, a manifest file may comprise segment identifiers 706 for identifying segments associated with a content item. A segment identifier may be a file name (e.g. segment_low-1.avi) or another suitable identifier for identifying a particular segment.

In an embodiment, a manifest file may further comprise location information comprising references to one or more network nodes, which are configured to deliver the identified segments to a client; and/or, which are configured to provide the client with information where the segments may be retrieved. Hence, such reference, which hereafter may be referred to as segment locator, may point to a network node configured to deliver an identified segment; or, alternatively, to a network node that is able to determine one or more network nodes which may be able to deliver an identified segment. In yet another embodiment, a segment locator may also point to location on a network node. For example, different segment locators may point to different folders defined in one delivery node.

In some embodiments, a segment identifier and a segment locator may be part of a predetermined data structure such as an URL. For example, the URL central.cdnA.com/segment1-1.avi comprises a segment locator central.cdnA.com, i.e. a pointer (or a reference) to a network node of CDN A and a segment identifier, i.e. segment file name segment1-1.avi wherein the network node associated with segment locator central.cdnA.com may be configured to deliver a segment to the client or may be configured to deliver one or more further segment locators pointing to one or more network nodes which may be able to deliver the segment segment1-1.avi. Although the examples hereunder are described using URLs, it is submitted that the invention is not limited thereto. In another embodiment, the segment identifiers and segment locators may take any suitable format suitable for identifying and locating segments in the network. In one embodiment, only a segment identifier may be used for identifying and locating a content delivery node. For example, the segment identifier may be sent to a resolver in the network, which resolves the identifier into a segment locator.

In the exemplary embodiment of FIG. 7, the manifest file comprises segment identifiers and segment locators associated with two different sets of segments, i.e. a first set of low-bitrate segments and a second set of high-bitrate segments, wherein each set forms a complete video title. Here, the segment locator part of the URLs associated with the low-bitrate segments points to a network node of a first content delivery network CDN A and the high-bitrate segments points to a network node of a second CDN B.

URLs in the manifest file may be preformatted URLs, wherein an URL may have one or more marked section allowing a client to determine where to insert a token and/or timing information such as timing information. For example, the segment URL cache_1cdn_A.com/video/segment_low-1.avi?token=%TOKEN%&time=%TIME% may comprise a position %TOKEN% and %TIME% in which a token and a clock-time may be inserted.

In one embodiment, the manifest file may further comprise a maximum token validation parameter indicating the maximum number a particular segment may be refreshed by the client. In another embodiment, the manifest file may further comprise a refresh URL, 1cdn_A.com/video/null_segment?token=%TOKEN%&time=%TIME%, which the client may use when a refresh request message needs to be sent to the CDN.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system.

The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The invention is not limited to the embodiments described above, which may be varied within the scope of the accompanying claims.

The invention claimed is:

1. A method for enabling token-based validation of delivery of at least part of a segmented content item by one or more delivery nodes to a content processing device, the segmented content item being associated with one or more segment identifiers that are comprised in a manifest file, the method comprising:

the content processing device sending a first segment request message to one of (i) the one or more delivery nodes or (ii) a request routing node configured for providing location information associated with the one or more delivery nodes, the first segment request message comprising a first identifier, the first identifier being one of a first segment identifier associated with a first segment or a first manifest file identifier associated with a first manifest file, wherein the first manifest file contains at least the first segment identifier;

responsive to the first segment request message, generating first validation information for validating a second segment request message comprising a second segment identifier, the first validation information comprising at least a first token and first timing information associated with processing of the first segment request message from the content processing device by one of (i) the one or more delivery nodes or (ii) the request routing node;

sending the generated first validation information to the content processing device;

the content processing device sending a second segment request message to one of (i) the one or more delivery nodes or (ii) the request routing node, the second segment request message comprising the second segment identifier and a uniform resource locator (URL) query string including the generated first validation information;

responsive to the second segment request message, validating the second segment request message sent by the content processing device based on the generated first validation information included in the URL query string comprised in the second segment request message;

generating second validation information for validating a third segment request message, the second validation information comprising at least a second token and second timing information associated with processing of the second segment request message from the content processing device by one of (i) the one or more delivery nodes or (ii) the request routing node; and sending the generated second validation information to the content processing device.

2. The method according to claim 1, wherein sending the generated first validation information to the content processing device comprises:

sending at least part of the generated first validation information in a first response message to the content processing device, wherein the first response message comprises response information, the response information being one of: at least part of the first segment, the first manifest file, or location information associated with at least one delivery node for delivering one of (i) the first segment or (ii) the manifest file.

3. The method according to claim 2, wherein sending the generated first validation information to the content processing device comprises sending at least part of the generated first validation information embedded in a header of a first response message.

4. The method according to claim 3, wherein the header is a HTTP header and the at least part of the generated first validation information is embedded in a header field in the header, and wherein the header field is communicated to the content processing device via a manifest file.

5. The method according to claim 1 wherein validating the second segment request message comprises:

authenticating the second segment request message on the basis of the first token.

6. The method according to claim 1, wherein the first token is generated on the basis of a token algorithm and the first timing information.

7. The method according to claim 1 wherein the first token is generated on the basis of a token algorithm and a content collection identifier associated with the requested segment; and, wherein validating the second segment request comprises:

associating the first segment identifier with a content collection identifier;

generating a reference token on the basis of the token algorithm and the content collection identifier; and comparing the reference token with the first token.

8. The method according to claim 1, wherein generating the first validation information comprises:

generating the first token on the basis of a token algorithm and the first timing information, the token algorithm being a one-way function or an encryption algorithm.

9. The method according to claim 1, wherein at least part of the manifest file comprises preformatted, at least parts of, uniform resource locators associated with the segment identifiers, an at least part of a preformatted uniform resource locator comprising one or more predetermined positions for inserting validation information, the validation information comprising a token.

10. The method according to claim 1, wherein at least one of the one or more delivery nodes is part of a content delivery network (CDN) comprising at least one request routing node and one or more delivery nodes for delivering segments to one or more clients, and wherein at least one of the request routing node or at least part of the one or more delivery nodes is associated with a validation module for validating a request message based on validation information.

11. The method according to claim 1, wherein a first part of the segmented content item is delivered by a first content delivery network (CDN) and a second part of the segmented content is delivered by a second delivery network; and wherein the first and second content delivery networks are configured to exchange information on a token-based validation method to be used by the first and second CDNs.

12. The method according to claim 11, wherein information on the token-based validation method to be used by the first and second CDNs includes at least one of: identification of the token algorithm for use in the first and second CDN, a token validity time, shared secret information for generating a token or an encryption key, or a token refresh policy.

13. The method according to claim 1, further comprising authorizing the second segment request message based on the first timing information.

14. The method according to claim 13, wherein the first timing information comprises a first clock-time associated with processing of the first segment request message and a token validity time associated with a time period in which the token is valid.

15. The method according to claim 1, wherein the at least one of the one or more delivery nodes is part of a content delivery network (CDN) comprising at least one request routing node and one or more delivery nodes for delivering segments to one or more clients, wherein the request routing node and at least part of the delivery nodes is associated with a validation module for validating a request message based on the validation information.

16. The method according to claim 1, wherein the first token is generated on a basis of a token algorithm, and wherein validating the second segment request message comprises:

generating a reference token on the basis of the token-generating algorithm and the first timing information; and comparing the reference token with the first token.

17. The method according to claim 1 wherein, the first or second timing information is one of an explicit or implicit part of the first or second token respectively.

18. The method according to claim 1, wherein the token-based validation delivery of segmented content by the one or more delivery nodes to the content processing device is based on an HTTP Adaptive Streaming protocol, and wherein the an HTTP Adaptive Streaming protocol is based on at least one of MPEG DASH or Apple HTTP Live Streaming.

19. A content delivery system configured for enabling token-based validation of delivery of a segmented content item to one or more content processing devices, the segmented content item being associated with at least one manifest file comprising one or more segment identifiers, the system comprising:
at least one delivery node configured to: (i) receive a first segment request message from a content processing device, the first segment request message comprising a first segment identifier associated with a first segment; (ii) subsequent to receipt of the first segment request message, send to the content processing device a first response message and first validation information for validating a second segment request message; (iii) receive a second segment request message from the content processing device, the second segment request message comprising a second segment identifier associated with a second segment, and, in a uniform resource locator (URL), the first validation information sent by the at least one delivery node and (iv) subsequent to receipt of the second segment request message, send to the content processing device a second response message and second validation information for validating a third segment request message; and
at least one validation module configured to generate both: (i) the first validation information comprising at least a first token and first timing information, wherein the first validation information is associated with the processing of the first segment request by the at least one delivery node, and (ii) the second validation information comprising at least a second token and second timing information, wherein the second validation information is associated with the processing of the second segment request by the at least one delivery node.

20. A content processing device for use with a content delivery system, the content processing device being configured for receiving at least part of a segmented content item from one or more delivery nodes associated with the content delivery system, the segmented content item being associated with one or more segment identifiers, wherein the content processing device is further configured to:
send a first segment request message to the content delivery system, the first segment request message comprising a first identifier, the first identifier being one of a first segment identifier associated with a first segment or a first manifest file identifier associated with a first manifest file, wherein the first manifest file contains at least the first segment identifier;
responsive to the first segment request, receive first validation information, the first validation information being arranged for validating a second segment request message by the content delivery system, the first validation information comprising at least a first token and first timing information, the first timing information being associated with processing by the content delivery system of the first segment request message received from the content processing device;
determine a second segment identifier;
send a second segment request message to the content delivery system, the second segment request message comprising the second segment identifier and a uniform resource locator (URL) query string including the first validation information; and
responsive to the second segment request, receive second validation information, the second validation information being arranged for validating by the content delivery system a third segment request message, the second validation information comprising at least a second token and second timing information, the second timing information being associated with processing by the content delivery system of the second segment request message received from the content processing device.

21. The content processing device of claim 20, wherein retrieval of the at least part of the segmented content item from the one or more delivery nodes by the content processing device is carried out using a data structure comprising one or more of the segment identifiers, and further comprising: one or more preformatted uniform resource locators associated with the segment identifiers, wherein a preformatted uniform resource locator comprises one or more predetermined positions for inserting validation information by the content processing device.

22. The content processing device according to claim 21, wherein said validation information comprises a token and timing information.

23. The content processing device according to claim 22, wherein the timing information is an explicit or implicit part of said token.

24. The content processing device according to claim 21, wherein the data structure further comprises a maximum token validation parameter indicating the maximum number a particular segment may be refreshed by a client inside the content processing device.

25. The content processing device according to claim 20, wherein the segment identifier is determined on the basis of a manifest file stored in a memory of the content processing device.

26. The content processing device according to claim 25, wherein at least part of the manifest file comprises preformatted, at least parts of, uniform resource locators associated with the segment identifiers, an at least part of a preformatted uniform resource locator comprising one or more predetermined positions for inserting validation information, the validation information comprising a token.

27. The content processing device according to claim 26, wherein the content processing device is configured for inserting the received validation information in the one or more predetermined positions, the segment request message comprising the at least part of the preformatted uniform resource locator comprising one or more predetermined positions with the inserted validation information.

28. A non-transitory computer readable medium having stored thereon software instructions that, if executed by a one or more processors of a system, cause the system to carry out operations for validation of delivery of at least part of a segmented content item by one or more delivery nodes of the system to a content processing device, the segmented content item being associated with one or more segment identifiers that are comprised in a manifest file, wherein the operations include:
sending a first segment request message from the content processing device to the one of (i) the one or more delivery nodes or (ii) a request routing node configured for providing location information associated with the one or more delivery nodes, the first segment request message comprising a first identifier, the first identifier being one of a first segment identifier associated with a first segment or a first manifest file identifier associated with a first manifest file, wherein the first manifest file contains at least the first segment identifier;

responsive to the first segment request message, generating first validation information for validating a second segment request message comprising a second segment identifier, the first validation information comprising at least a first token and first timing information associated with processing of the first segment request message from the content processing device by one of (i) the one or more delivery nodes or (ii) the request routing node;

sending the generated first validation information to the content processing device;

sending from the content processing device to one of (i) the one or more delivery nodes or (ii) the request routing node a second segment request message comprising the second segment identifier and a uniform resource locator (URL) query string including the generated first validation information;

responsive to the second segment request message, validating the second segment request message sent by the content processing device based on the generated first validation information included in the URL query string comprised in the second segment request message;

validating the second segment request message and generating second validation information for validating a third segment request message, the second validation information comprising a least a second token and second timing information associated with processing of the second segment request message from the content processing device by one of (i) the one or more delivery nodes or (ii) the request routing node; and sending the generated second validation information to the content processing device.

* * * * *